United States Patent Office 3,310,043
Patented Mar. 21, 1967

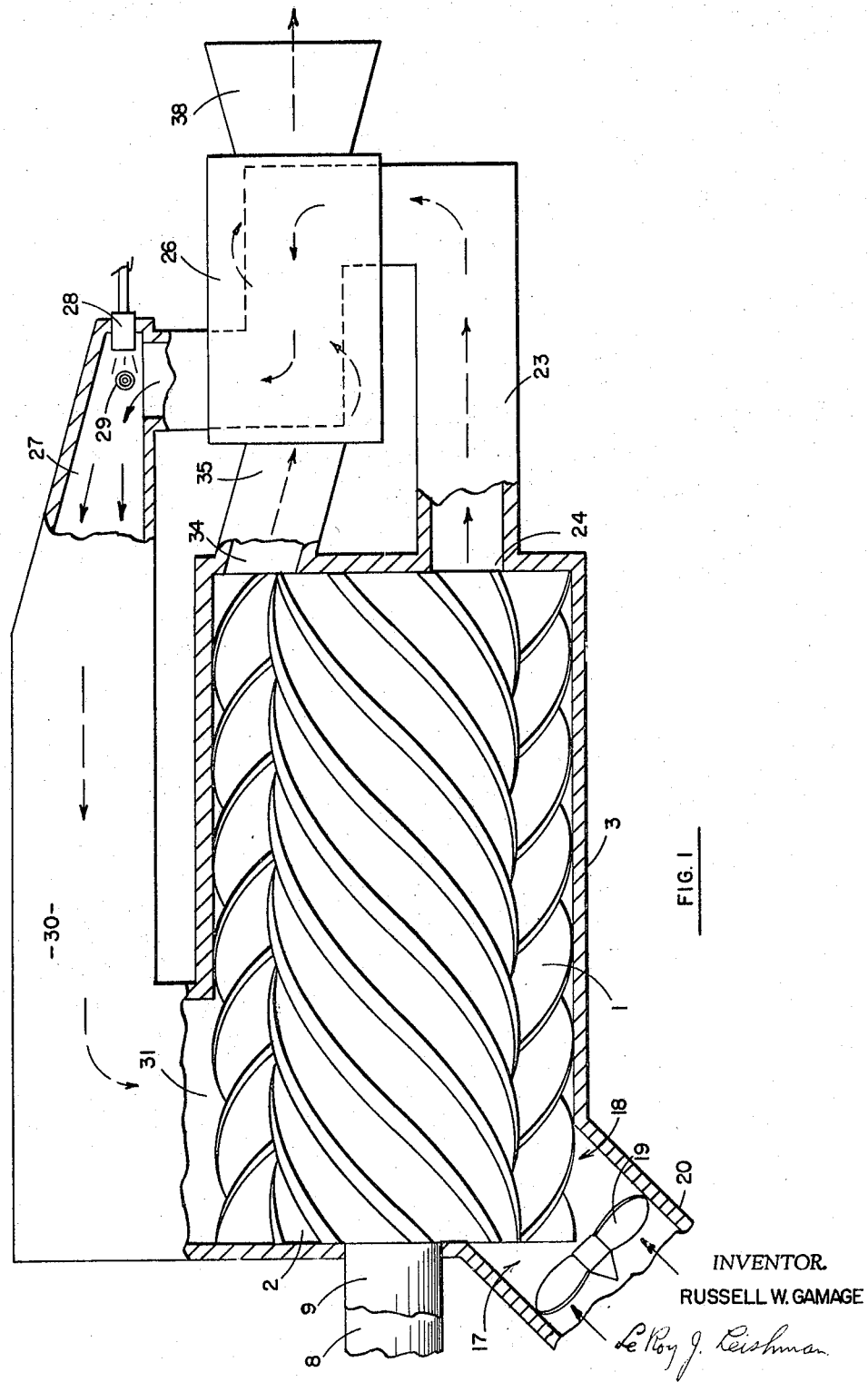

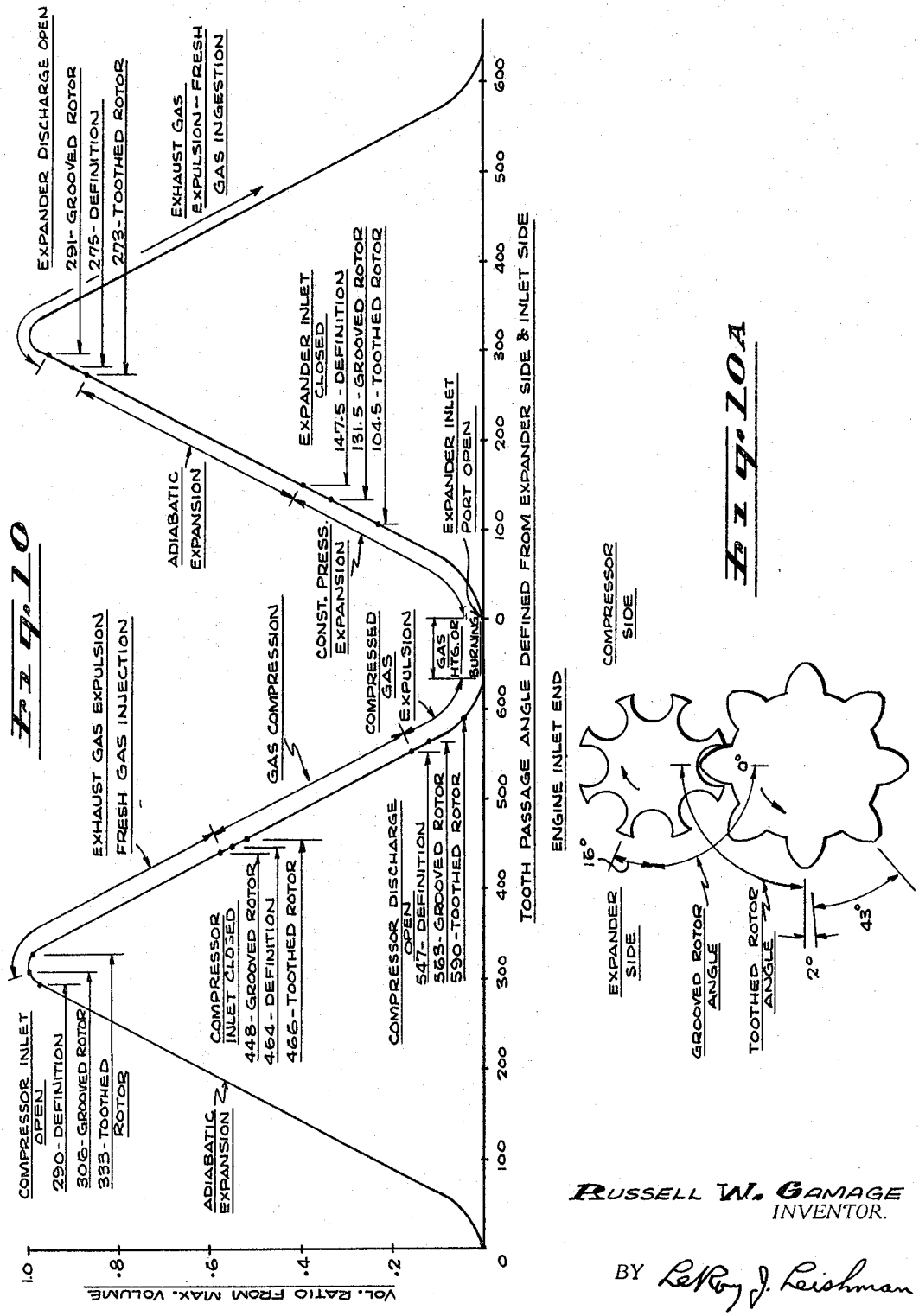

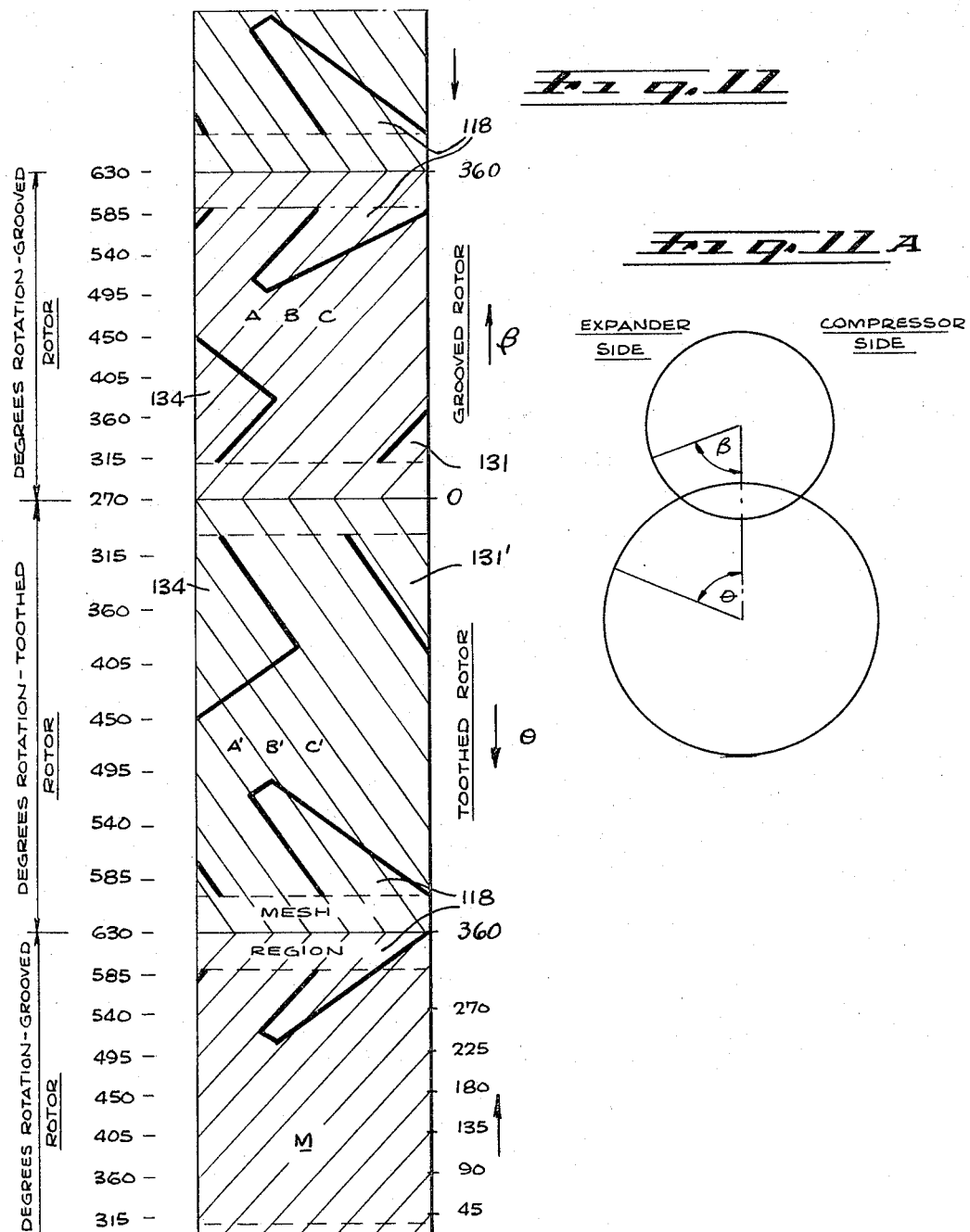

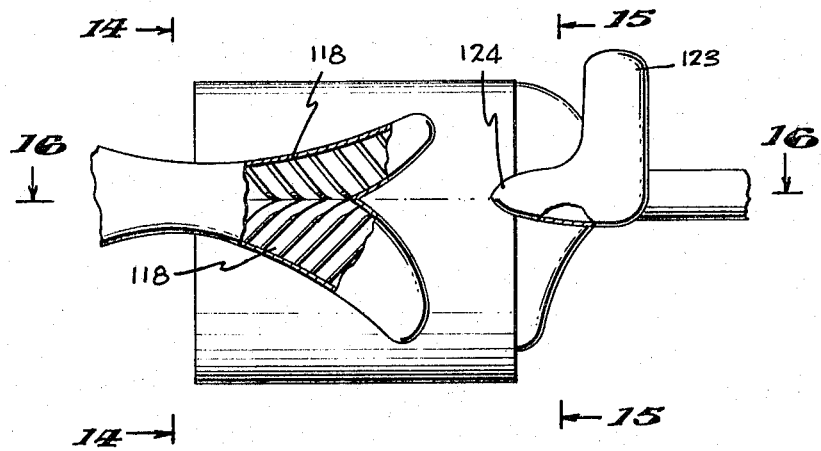
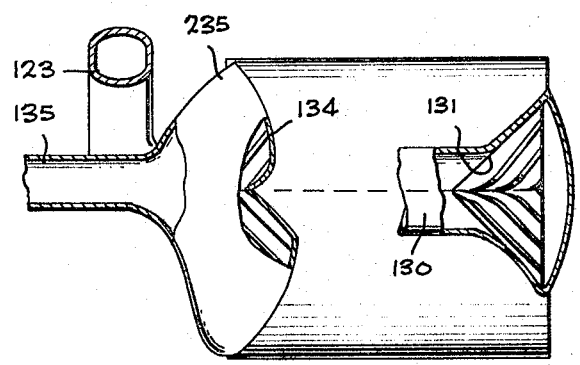
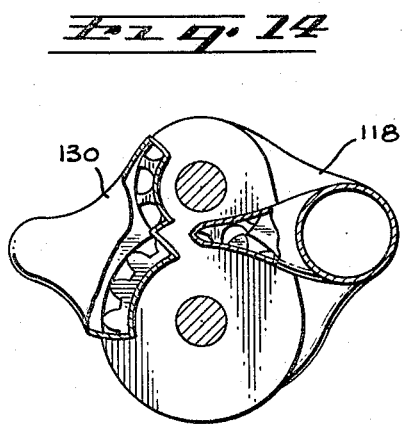
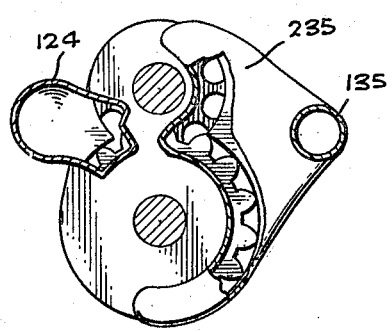
INVENTOR.
RUSSELL W. GAMAGE
BY
LeRoy J. Leishman
AGENT

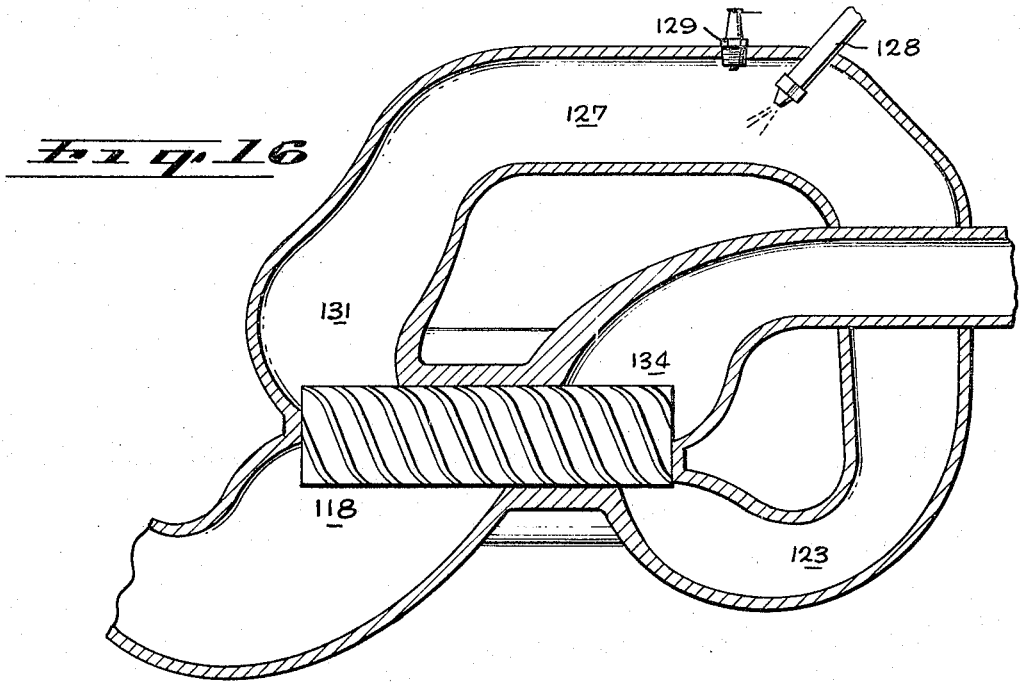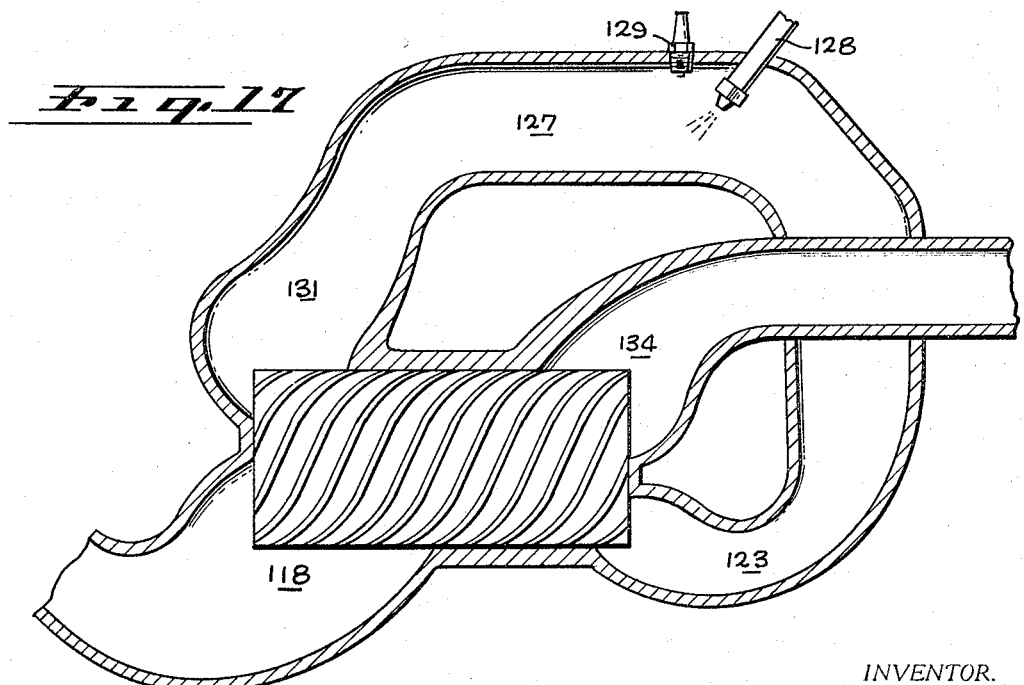

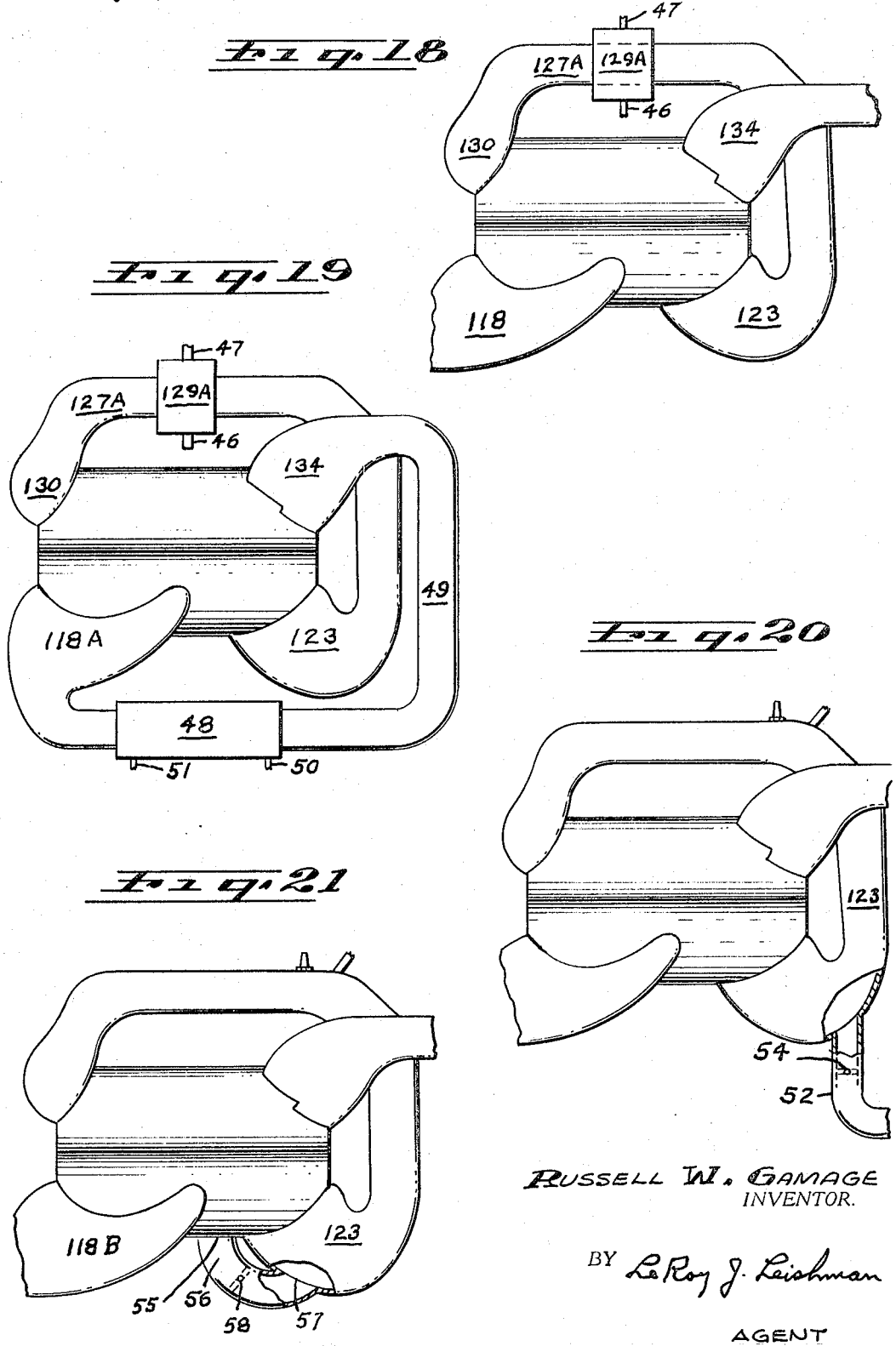

3,310,043
ROTARY EXTERNAL COMBUSTION ENGINES
Russell W. Gamage, 8201 Tuscany Ave.,
Playa Del Rey, Calif. 90291
Filed May 17, 1965, Ser. No. 467,158
10 Claims. (Cl. 123—12)

This application is a continuation-in-part of application Ser. No. 191,008, filed Apr. 30, 1962.

The invention herein described pertains to a rotary external combustion engine having a single pair of meshing rotors, one of said rotors having helical grooves therein and the other having helical teeth mating with the helical grooves.

Rotary engines of this general type have heretofore used either more than one pair of rotors to accomplish the required functions, or they have been internal combustion engines in which the combustion has taken place within the tooth and groove passages of the rotor near one end thereof. In the present simpler arrangement using only a single pair of rotors, combustion takes place outside the rotors and case, between non-moving surfaces, thus eliminating the necessity of rotating gas seals and associated complex structures.

In previous engines of this general type, but requiring internal combustion, the combustion has necessarily been intermittent, involving ignition timing systems, detonation limits, impulsive torque delivery, flame radiation, flame temperature heat losses, higher structural surface temperatures, and the possibility of pre-ignition in adjoining intertooth-and-groove passages, depending upon the adequacy of the seal between the case and the revolving rotors.

Internal combustion in an engine of this type lowers the engine capacity, because a considerable portion of the expanding volume must be used for the purpose of introducing fuel and air into the groove and tooth passages prior to closing them off by the solid portions of the rotors that traverse the port openings or by valves that require structure other than that provided by the rotors and casing.

Moreover, such a rotary internal combustion engine, if operating as a constant volume type engine, requires fuel air ratios in the ignitable range. These considerations reduce flexibility in engine power output that would otherwise permit it to run at off design torque or power. If an attempt were made to stay below the ignition fuel air ratio limits in such an internal combustion rotary engine by using a constant pressure cycle, it is improbable that gas compressions high enough to produce combustion could be reached without using complex ignition and ignition timing systems.

One of the primary objects of the present invention is to eliminate the disadvantages of the prior art engines by providing a practical rotary engine having a single pair of meshing helical groove and tooth rotors in which combustion takes place outside the rotors and case.

Another object is to provide an engine of the type described in which combustion is continuous.

A further object is to provide an engine of the type described that can operate at net fuel-air ratios other than those required by ignitable mixtures by doing the actual burning at temperatures higher than those contemplated for engine use and then diluting the mixture sufficiently to get down to the temperature chosen for engine operation.

An additional object is to make it possible to manufacture an engine that will permit higher operating gas temperatures than conventional gas turbine engines.

Another object is the provision of a rotary external combustion engine that will operate on an essentially constant pressure cycle.

An additional object is to provide an engine of simple design in which the volume ratio during expansion is different from the volume ratio during compression.

Another object is to provide an engine having meshing rotors that rotate in confined spacial areas having semi-cylindrical side walls with ports therein that selectively communicate with peripheral passageways in and between said rotors as the passageways traverse the ports, and in which the cycle of the engine is determined by the location and shape of the ports.

A further object is to provide a design that will make possible the manufacture of rotary engines of very light weight for the power obtained as compared with contemporary engines.

An additional object is to provide a rotary external combustion engine of the type described that is adaptable to various methods of scavenging.

Another object is to provide a rotary external combustion engine in which the heat may be generated outside of the closed system and transmitted to the proper portions thereof by conduction.

Another object in an engine of the latter type is to provide an arrangement that will permit the gases to be heated by atomic energy.

Yet another object in an engine of the general type described is to provide means whereby some of the air that is being compressed therein may be made available for other purposes than the operation of the engine.

This invention possesses many other advantages, and has other objects which may be made more clearly apparent from a consideration of illustrative embodiments thereof. For this purpose, such embodiments are shown in the drawings accompanying and forming part of the present specification. These drawings will now be described in detail illustrating the general principles of the invention; but it is to be understood that this detailed descrption is not to be taken in a limiting sense since the scope of the invention is best defined by the appended claims.

In the drawings:

FIGURE 1 is a cutaway plan view of the rotor mechanism with various ducts, a burner, a blower and a regenerator shown diagrammatically;

FIG. 10 is a graph showing the groove and tooth volume as it varies with the angular rotation of the rotors from which specific port locations may be determined;

FIG. 10A shows the angular relationship of the rotors as they appear at the engine inlet end when a meshing groove and tooth are at the center of the mesh region;

FIG. 11 is a development, or flat projection, similar to FIG. 9 of the peripheries of the rotors for the embodiment illustrated in FIGS. 12 to 16, showing the locations of the ports with respect to the helical grooves and teeth;

FIG. 11A is an angle definition of the flat projection of FIG. 11;

FIG. 12 is a side elevation of another embodiment of the engine with certain parts cut away to show the relationship between the fresh air inlet port and the rotors and also the relationship between the compressed air outlet port and the rotors and additionally the relationship between the outlet port and inlet port;

FIG. 13 is a view similar to FIG. 12 but of the opposite side of the engine showing the ports therein and the ducts communicating therewith;

FIG. 14 is a section taken on line 14—14 of FIG. 12;

FIG. 15 is a section taken on line 15—15 of FIG. 12;

FIG. 16 is in part a section through the conduits taken substantially on line 16—16 of FIG. 12—the mesh line of the rotors, and in part a plan view of the engine with the top cover broken away to reveal the top rotor;

FIG. 17 is in part a section through the conduits taken substantially on line 16—16 of FIG. 12 and in part a plan view of the engine with upper portions cut away to show the lower rotor;

FIG. 18 is a block diagram of an embodiment of the invention in which combustion of the gases within the conduit leading to the hot gas intake port is replaced by heat produced by chemical or atomic energy;

FIG. 19 illustrates a closed cycle engine with the addition of means for cooling the recirculating gases as they pass from the expansion side of the engine to the intake port of the compression side;

FIG. 20 illustrates a modification in which compressed air is taken from the system for uses other than engine operation; and FIG. 21 illustrates a modification in which an extra port is provided in the compression side of the engine at a region where the gas pressure is less than design pressure, by-passing the compressed air directly to the conduit leading to the burner, and in which a valve is provided to control the amount of air passing through the extra port.

Figure 2:
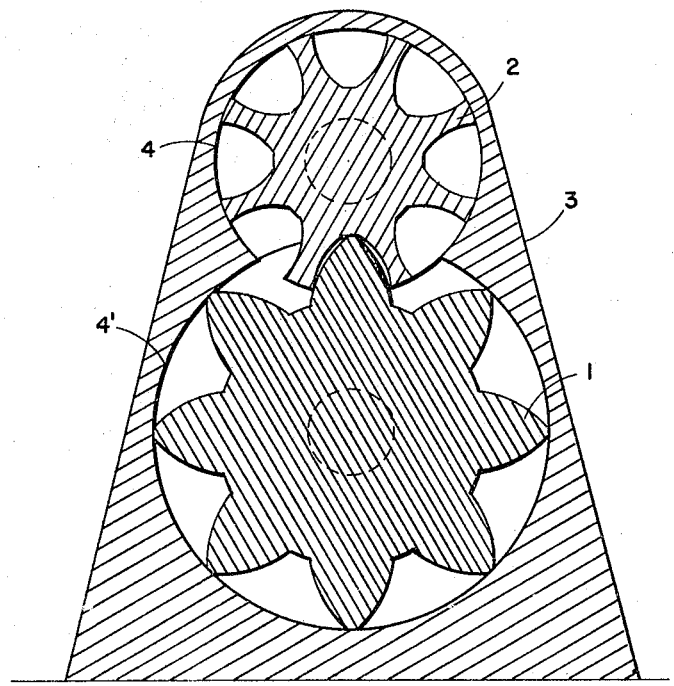
FIG. 2 is a cross section taken on line 2—2 of FIG. 3, illustrating the internal shape of the engine block of one embodiment of my invention and showing the configuration of the teeth and grooves of the two helical rotors that are the principal moving elements of the engine.
Figure 4:
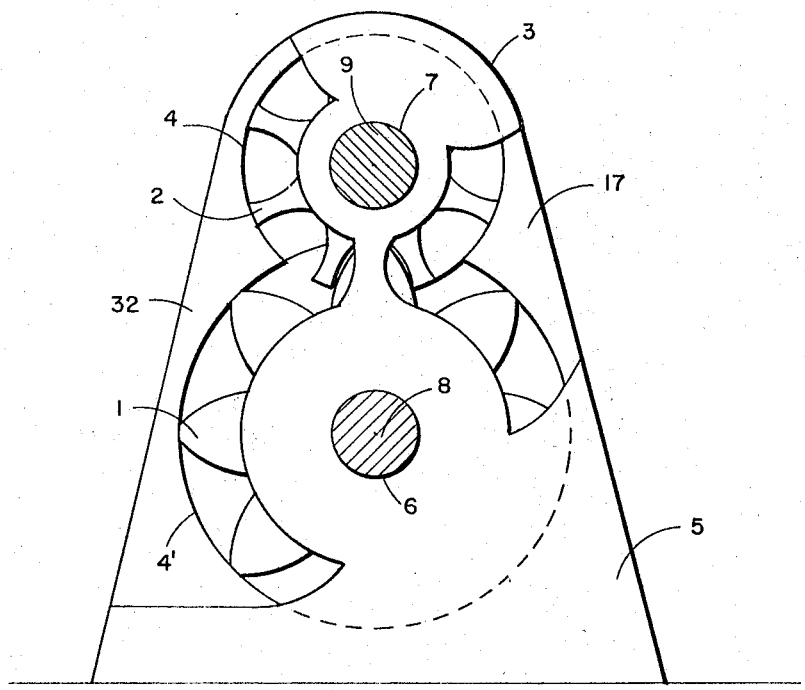
FIG. 4 is a left end view of the structure of FIG. 3.
Figure 5:
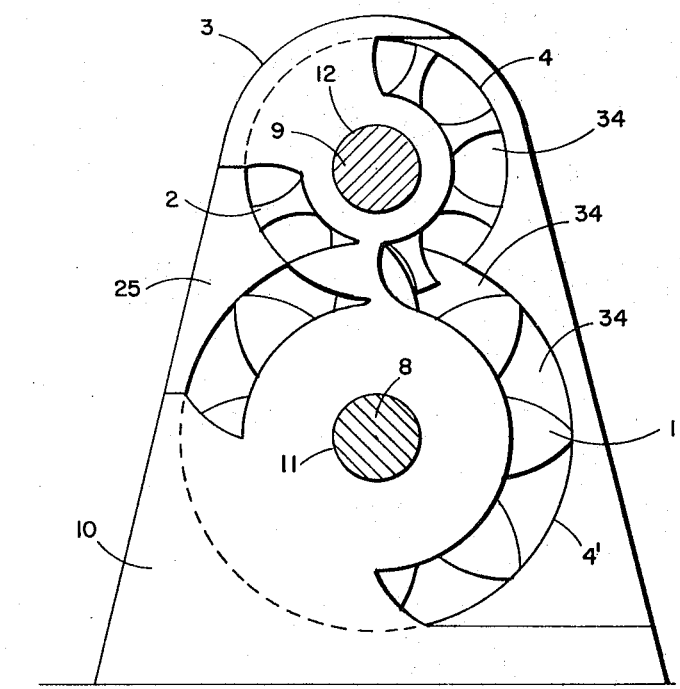
FIG. 5 is a right end view of the device of FIG. 3 showing certain details of the porting system.
Figure 6:
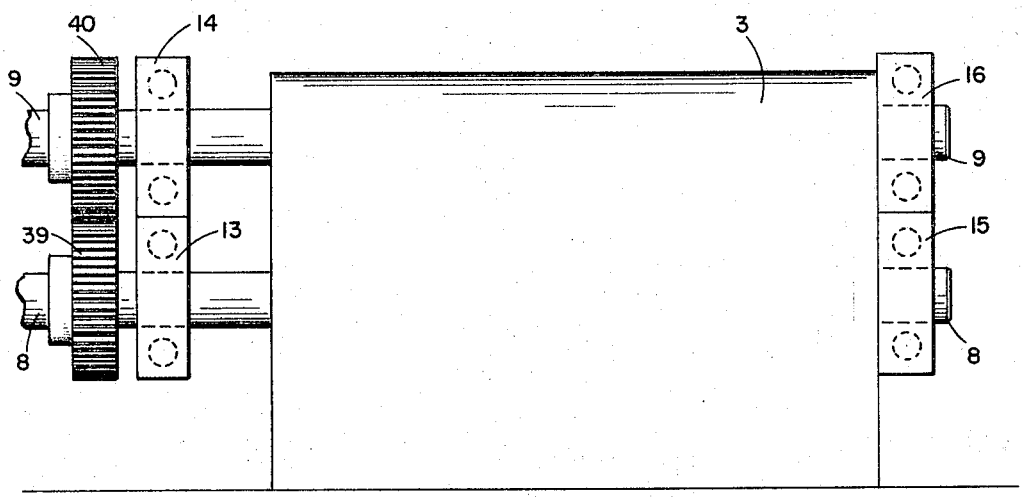
FIG. 6 is a view similar to FIG. 3 with the ports omitted, showing a pair of gears attached to the shafts of the two rotors in order to keep them rotating in the proper angular relationship.
Figure 7:
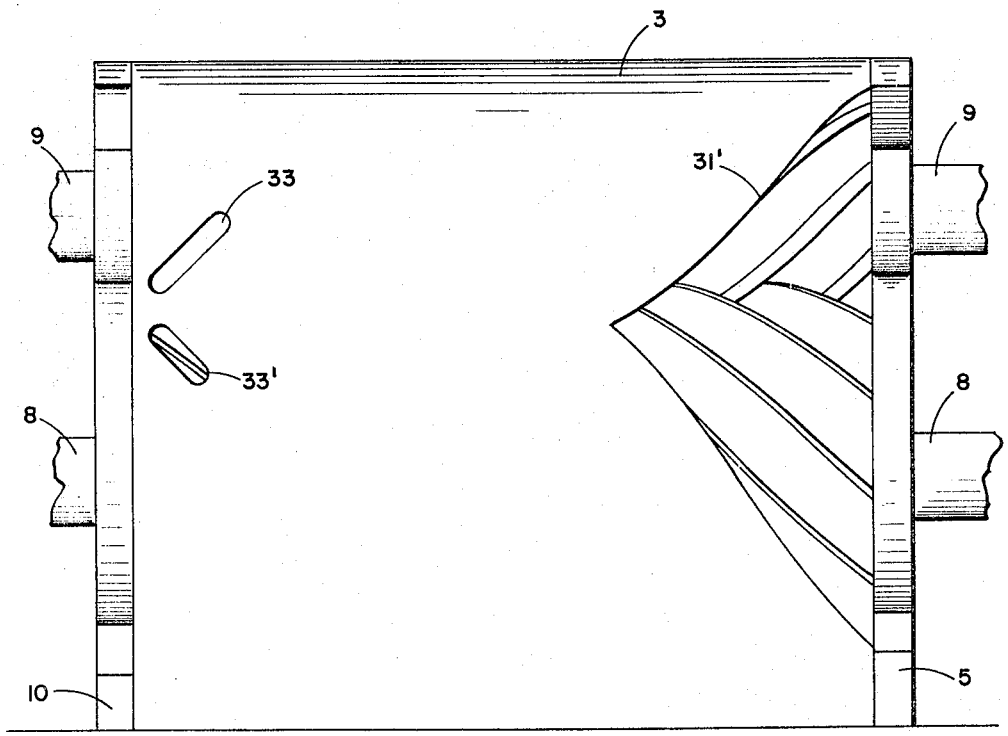
FIG. 7 is an elevation of the expander side of the engine showing the port on the right where the hot gases are introduced and on the left an exhaust port.

In engines embodying the invention illustrated and described herein, the principal parts are two meshing rotors and a casing, which may be seen in cross section in FIG. 2. Rotor 1 (hereinafter referred to as the toothed rotor) has helical teeth of essentially epicycloidal shape projecting outward from the pitch line. Rotor 2 (hereinafter referred to as a grooved rotor) has helical grooves of essentially epitrochoidal shape cut radially inward from the pitch line. This type of cooperating configuration produces a low leakage seal across the mesh region of the two rotors. These two rotors are confined in a case 3 that fits tightly against the ends and peripheries of both rotors excepting where they are in mesh, as shown in FIGS. 2, 4 and 5. The rotors are supported, by means not shown in these particular figures, within two overlapping bores 4 and 4'.

Each helical groove and mating helical tooth provides an enclosure of continuously varying volume as shown in FIG. 10, starting from zero volume on the expander side and intake end where the rotors roll away from mesh to a maximum volume where and when the mating pair is most nearly out of mesh, and then back to zero volume as the helical groove and helical tooth move toward mesh again on the opposite side and opposite end of the rotors, hereafter referred to as the discharge end.

This characteristic of contained increasing and decreasing volumes may be used to provide a power-producing engine by utilizing the diminishing volume as a means for efficiently compressing a working gas, heating it by combustion or by other means of producing high temperatures (such as chemical or nuclear) and utilizing the increasing volume as a means of extracting power in either a constant pressure expansion or a combination of constant pressure and adiabatic expansion, and using the space and time at the end of expansion and the start of compression as a region or time for combusted or heated gas rejection or expulsion and the introduction of new or recirculated gas, depending upon the type of heating employed. Within the restraints of the volume curve, as shown in FIG. 10, many combinations of cycles and design conditions may be produced.

The compression ratio can be varied by changing the ratio of compressor inlet cut-off volume to compressor discharge volume, varying the engine design temperatures by changing the ratio of compression discharge volume to expander inlet cut-off volume, limited only by burner and engine thermal limits. The design pressure ratio of the engine, inefficiencies, leakage, off-design point operation and other practical considerations, define the power-extraction characteristics of the expander. The expander exhaust port opens in advance of the maximum volume, because of the lead required for the expander release and the allowances that must be made for effective exhaust ejector pumping when such pumping is employed. Due to these requirements, the opening of the expander release port must precede the opening of the compressor port to insure that the exhaust will flow out at the exhaust port rather than blow back into the engine.

The basic thermodynamic cycle characteristics of the engine may vary from a standard constant pressure cycle, similar to a diesel cycle, with external burning, to a gas turbine or Brayton type cycle. By extending the design further in this direction, the portion of the volume curve not employed for expansion may be used to draw in new air by natural aspiration. The engine may be so designed that atmospheric pressure is reached in the expansion process before the full expander volume has been reached. If the compressor inlet port is opened at this point, the increasing volume induces the inflow of clean, non-combusted air. When sufficient clean air has been ingested or the maximum volume has been reached, the compressor inlet port may be closed and the exhaust or scavenge port opened. When the combusted gases have been expelled, the exhaust port is closed, permitting the compression of the air that is then present in the inter-groove-and-tooth spaces. Variations of this sort from a diesel to a Brayton cycle may be classified as variations in engine design volume ratio. This situation is analogous to the situation that would prevail in a piston engine if its piston downstroke or expansion were different from its upstroke or compression.

The description of this engine has thus far been directed to its operation at the design point only. We will now consider its off-design point operation at a fixed speed of rotation.

Deviations in output torque may be produced by varying the rate of fuel flow and thus varying the burner discharge temperature. If this temperature is varied downward, then the burner pressure has to diminish in order to preserve flow equilibrium and to match the gas inflow to the gas outflow. The fixed porting will cause the air or other gases to be compressed to the design pressure ratio, but this pressure will drop to the burner inlet pressure when the compressor discharge port opens. The net result of the reduced pressure is a lower power input.

When more than design point power is desired, the fuel rate must be increased. The burner temperature will then rise accordingly, along with the burner and compressor discharge pressure. The compressor will compress the air or other gases contained in any given groove and tooth volume to the design pressure, and when the port opens the contained gases will be compressed to the burner inlet pressure by the back flow. The higher pressure will result in higher power.

Any cyclic losses in the system due to over compression can be reduced or eliminated by added valves in the compressor discharge system, these valves being so located that they will open before the normal compressor outlet opens, thus relieving the overcompression losses. Such valves may be operated by the inherent pressure differences.

Water may be sprayed into the air being injected into the engine to reduce the temperature rise of the gas that is being compressed. This reduces the power required for compression with a consequent increase in shaft horsepower. Water may also be injected into the burner to increase the flow into the expander for momentary or sustained boosts in power.

It is possible to bleed compressed air from the system, thus producing a self-contained air compressor with the port adjusted to compensate for the air thus removed.

The engine may be cooled with gas or liquid coolant flowing through passages in the rotors and in jackets around the case. Cooling in such a fashion with coolants (gas or liquid) that are not controlled or elevated by the inherently higher cyclic gas temperatures allow more effective structural temperature control and permit higher cyclic gas temperatures. Liquid cooling is preferable because of the higher heat transfer coefficients of liquids. Increases in cyclic gas temperatures are permissible, however, if the rotors and case are insulation-coated.

Regeneration may be used by transferring heat from the exhaust gases to the compressed air stream, as illustrated in FIG. 1, thus reducing the required fuel consumption. The port timing may be altered in order to adapt the engine to this type of operation.

In the embodiment of the engine illustrated in FIGS. 1 to 10, the left end plate 5, FIG. 4, having openings 6 and 7 to permit the passage therethrough of shafts 8 and 9, is attached to the left end of the body block 3 adjacent the ends of rotors 1 and 2. A similar end plate 10, FIG. 5, is provided for the right end of the rotor block. The end plate 10 has openings 11 and 12 through which the rotor shafts 8 and 9 respectively pass. Shaft 8 is supplied with bearings 13 and 15 at the left and right ends respectively, as shown in both FIGS. 6 and 8. The supports for these bearings have been omitted from these figures for the sake of clarity and simplicity, and the bearings themselves have been omitted from the other figures for the same reason.

Figure 3:
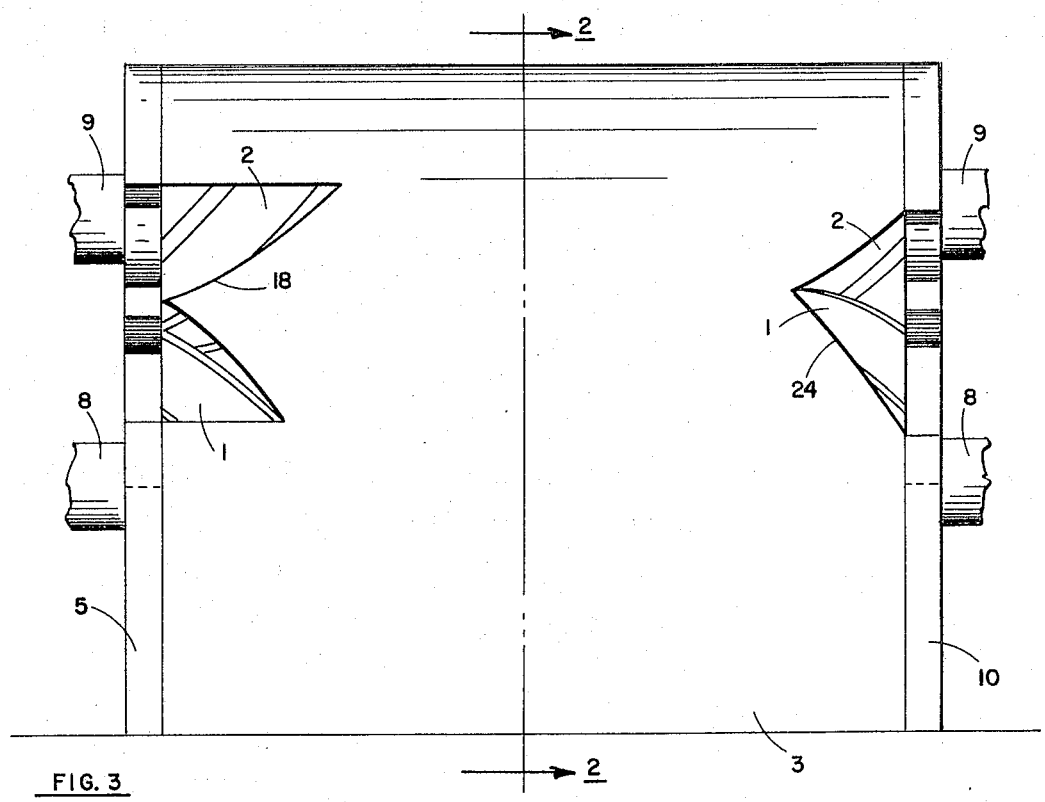
FIG. 3 is a front elevation of a simple embodiment of my invention, with the manifolds, cooperating gears and other external parts omitted in order to show more clearly the ports on the side of the engine where compression is effected.
Figure 8:
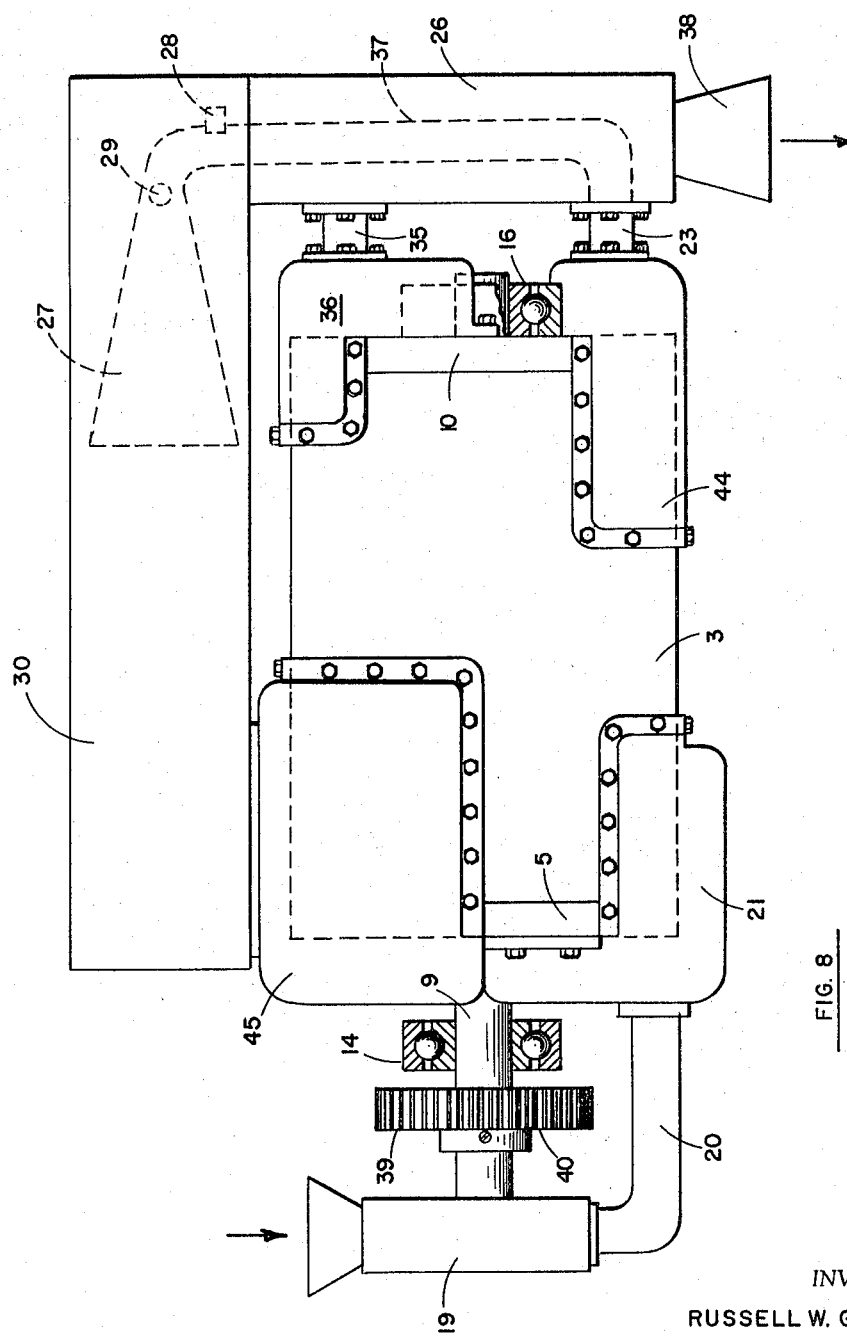
FIG. 8 is in part a top plan view and in part a diagrammatic representation of the manifold, duct, burner, regenerator and blower that are elements of one embodiment of my invention.

Air may be introduced into the inter-rotor and housing space on the compression side of the rotors through port 17 in the end plate 5 and the associated and communicating port 18 in the casing, FIG. 3. If the engine is designed for natural aspiration, the air is introduced directly into these ports. Otherwise, a blower 19, FIGS. 1 and 8, is provided. The compressed or forced air from this blower is conducted to the air inlet port through a duct 20, FIGS. 1 and 8. In actual practice, a manifold 21, shown in FIG. 8 (but omitted in the diagrammatic illustration of FIG. 1 for the sake of simplicity) is interposed between the duct 20 and the air inlet port 17 and 18, FIGS. 4 and 3 respectively.

Figure 9:
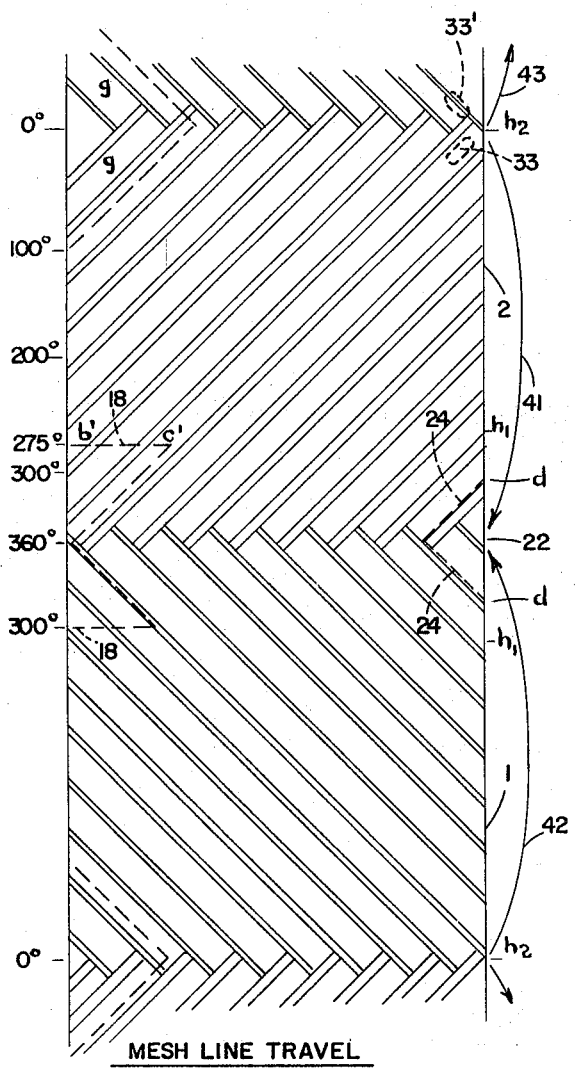
FIG. 9 is a development or flat projection of the peripheries of the rotors for one embodiment of my invention, showing the various angular positions with respect to the mesh line at which certain pressure and volume conditions will prevail in an engine designed to have a pressure ratio of 4:1.

As the rotors roll together toward the mesh line 22, FIG. 9, the air is compressed, and each specific model of the engine is so designed that the compressed air is released into the duct 23, FIGS. 1 and 8, through ports in the casing and end plate 10 that are so shaped and disposed with respect to the length and breadth of the rotors that the air will have been compressed to the desired pressure. If the pressure ratio is to be substantially 4.0, the compressed air discharge ports in the casing and right end plate, respectively, may be defined substantially like port 24, FIG. 3, and the associated and communicating port 25, FIG. 5, in the right end plate 10. The air that has been compressed in the diminishing air spaces by the revolving rotors, passes from the aforementioned air outlet ports through manifold 44, FIG. 8, into the compressed air duct 23. Unless this air is to be heated in a heat-transfer system or regenerator 26 for an engine having high thermal efficiency, it passes directly from the compressed air duct 23 into the burner 27.

The fuel may be introduced into the compressed air by means of a jet 28, FIGS. 1 and 8. When starting the engine, the mixture of compressed air and fuel is initially ignited by a spark plug or other suitable means 29, FIGS. 1 and 8. After ignition combustion is continuous. The hot gases remain at substantially constant pressure in the portion 30 of the burner from whence they are introduced into the inter-rotor-and-casing spaces on the expansion side of the rotors through a suitable intake port or ports, such as port 31, FIG. 1, or port 31′, FIG. 7, and the associated and communicating port 32 in the end plate 5, FIG. 4, via a manifold 45, FIG. 8. The pressure of the hot compressed gases against the spiralled teeth and grooves of the oppositely rotatable rotors, force the rotors to rotate. After the expanding gases have thus thrust the teeth and grooves aside, thereby causing the rotors to turn, the gases are released through the exhaust port 33 and 33′, FIG. 7, and port 34, FIG. 5.

When the exhaust gases leave these exhaust ports, they pass through an exhaust manifold 36, FIG. 8, into duct 35, FIGS. 1 and 8. If regeneration is not being used, these gases may then be liberated directly into the surrounding atmosphere. Otherwise, they are introduced into the heat-transfer device or regenerator 26 in spaces that adjoin the portions 37 of the compressed air conduit system through which the compressed air passes to the burner 27. The areas within the heat-transfer device 26, through which the exhaust gases pass, are separated from the compressed air duct system 23. When a regenerator is used, the exhaust gases may escape to the surrounding atmosphere through an exhaust pipe or cone 38, but an exhaust gas ejector may optionally be interposed to force the scavenging.

The various aforementioned ports need not extend all the way through the casing or end plates. The ports through the walls and their associated manifolds may be replaced by cavities communicating via suitable passageways with the manifolds.

In order to keep the rotors in accurate angular relationship during their rotation and to reduce the wear that otherwise would widen the grooves on rotor 2 and narrow the teeth on rotor 1, a gear 39 is rigidly mounted on shaft 7 and a mating gear 40 is affixed to shaft 8.

In an engine designed for natural aspiration and a cyclic temperature of 2,000° Fahrenheit with a compression ratio of 4.0 and a compressor volume of 9% of the maximum compressor volume when the compression ratio of 4.0 has been reached, the angle of the grooves on rotor 2 and of the teeth on rotor 1 may be such that they have a "wrap angle" of 360°. This is indicated in FIG. 9 where the peripheries of the rotors are shown as if they were unrolled and flattened so that the whole compression and expansion concept may be visualized in a plane. The center mesh line shown in the figure is of course on the compression side of the rotors. The 0° line at the top and bottom are really the same line, and it represents the expansion mesh line where the respective surfaces are originating. The rotor angles are shown on the left side, and the arrows 41, 42 and 43 on the right side indicate the direction of rotation.

The general location and shape of the air inlet and outlet ports 18 and 24, as well as the hot gas intake port 31, are indicated in broken lines in FIG. 9.

Its structure and operation can probably best be explained in conjunction with an explanation of FIGS. 10, 10A and 11.

Zero angle shown on FIGS. 10, 10A and 11 is the position where the pertinent groove in the end of the grooved rotor is centered on the axis-to-axis plane of the rotors as shown in FIG. 10A with the center of the end of the pertinent tooth aimed at the axis of the grooved rotor. In the presently preferred embodiment, the tooth and groove passages have a 270° angle in the helix, as probably best shown at the bottom of FIG. 11 where it will be seen that the center line of groove M starts at zero angle (which is marked on the right hand side of the figure) and that it ends at the 270° designation on the right side of the rotor. Inasmuch as the teeth on the toothed rotor on the compression side of the axis-to-axis plane are directed away from the mesh region toward which they are turning, the rotor must turn 270° more than a complete revolution to compensate for the helix angle in order to complete the entire air passage volume curve.

In following these graphs it is well to remember that a port opens to a given groove when the leading edge of such groove crosses the port's edge and that it closes when the trailing edge of the groove crosses the port's opposite or closing edge. Inasmuch as the angular width of the grooves in the presently discussed embodiment is 32°, the leading edge of the groove precedes the groove's center line by 16°, requiring that the port's opening edge be located 16° ahead of the defined position and that the port's closing edge be 16° behind the defined closing position. Thus, the defined angular position for the air inlet opening is 290°, but the physical location of the port's opening edge is 306°; and while the defined position for the closing edge of the air inlet port for the grooved rotor is 464°, its actual physical location is half a groove-width less, or 448°.

The opening edges for the ports for the toothed rotor must be so located that the trailing edge of the tip of the tooth will cross it as the defined angular position. Since the tooth center-to-center angular separation, or pitch angle, is 45° and the tip of the tooth 4° across, the port's opening edge must preceed its 290° defined position by 45° minus one half the width of the tooth tip, or 2°, thus locating the port's opening edge at 333°. One half the width of the tooth tip, or 2°, must be added to the port's defined 464° closing position to locate the physical closing edge of the port. This places it at 466°, as shown on the graph.

It will be observed in FIG. 11 that the air or compression inlet port 118 is open to the exhaust port 134 through approximately three groove spaces A, B and C on one side of the mesh region and three intertooth spaces A', B' and C' on the other. The scavenging of these grooves and intertooth spaces begins immediately upon the opening of these ports, the scavenging being effected by any of the means hereinafter explained.

Both of these ports close at the 464° position shown on the compression curve in FIG. 10 and on the left side of FIG. 11, leaving the scavenged grooves and intertooth spaces full of fresh air. The combined maximum volume of any groove and associated intertooth space is indicated at the peak of the volume curve at approximately 330°. These grooves and intertooth spaces move toward the mesh region and the compressor discharge port 124, FIGS. 11 and 12. When this port opens, its volume, as illustrated by the graph, is such that the designed compression ratio of 4 to 1 for the present embodiment is obtained.

The compression inlet port 118, located as defined on the curves of FIG. 10, may be seen in the engine case in FIG. 12, where the inlet manifold is broken away to show the relationship of the port to the helical groove and helical tooth spaces of the rotors. This port and its relationship to the grooves of the grooved rotor and the intertooth spaces of the toothed rotor are also shown in FIG. 11.

When the compression discharge 124, FIGS. 11 and 12, opens at the defined angular position of 547° shown at the bottom of the curve, FIG. 10, the compressed air passes through manifold 123, FIGS. 12 and 16, toward the combustion area 127, FIGS. 16 and 17, where fuel is introduced through the nozzle 128 and ignited by spark plug 129.

The expander inlet port 131, FIGS. 11 and 13, opens at the bottom of the expansion curve at a defined angular position of 0°, and the hot gas expands at constant pressure until the expander inlet port closes at the defined angular position of 147½° on the expansion curve of FIG. 10. The expander inlet port 131 may be seen physically in FIG. 13 and in the rotor development diagram FIG. 11 where its opening to the grooved rotor is designated by the numeral 131 and its opening to the toothed rotor by 131'.

When the expander inlet closes, the gases expand adiabatically until the exhaust port opens at a defined angle of 275° as shown on the expansion curve in FIG. 10 and also in FIGURES 11 and 11A where the exhaust port 134 may be seen in its relationship to the rotors and in FIG. 13 in its physical position within the manifold 235.

FIGURE 11A illustrates the angular relationship for the angles $\beta$ and $\theta$ in FIGURE 11.

The grooves of the grooved rotor and the teeth of the toothed rotor are forced apart during the entire expansion process. The shafts of these rotors have been omitted from FIGS. 12 to 17 for the sake of clarity, but it will be understood that they operate in the same manner as do the shafts 8 and 9 of the previously described embodiment.

As previously mentioned, the products of combustion may be scavenged through the exhaust port 134 in any of several ways. One of these is by use of a blower 19, FIGS. 1 and 8, which blows fresh air through the conduit 20 into the air intake port 18, FIGS. 1 and 3, which is a counterpart of the air inlet port 118 of the present embodiment. This blower may be operated by power from the engine or from any other appropriate source.

A second means of scavenging is by means of an exhaust fan. The use of such a fan draws the combusted gases through the exhaust port and through a regenerator 26, FIG. 8, if generation is used, and it ingests fresh air into the air inlet port at the other end of the system. If regeneration is omitted, the exhaust fan may be placed adjacent the exhaust port.

A third method of scavenging is by means of ejector pumping. The design for the porting system of the presently preferred embodiment is such that the expander pressure is above atmospheric pressure when the expander discharge port opens. This choice, for the port positions as defined in FIG. 10, is deliberate in order to increase engine capacity and to produce a high velocity jet to ejector pump the remaining combusted gas from the groove and intertooth pasages. The expander discharge port opens at 275° and the compressor inlet port does not open until 290°. Consequently 15° of rotor rotation is available for the pressure of the gas in the associated groove and intertooth passages to be reduced to atmospheric pressure. This energetic gas stream, if properly directed, will produce a strong suction-pump effect in the expander discharge manifold that will pump the remaining exhaust gas out and ingest fresh air into the communicating passages through the air inlet port.

In the previously described embodiments of the invention the gases that expand in the grooves and intertooth spaces of the rotors were heated by combustion of the gases and the products of such combustion were scavenged through the exhaust port. If the compressed gases are brought to a satisfactory temperature to provide the required power by other means, combustion is obviously not necessary. Adequate heat may be obtained from other sources such as chemical reactions or atomic energy. Such an arrangement is illustrated in a block diagram in FIG. 18 where the compressed gases from the manifold 123 pass through a radiator 129A which is heated by a suitable gas or liquid brought to the right temperature by chemical reactions or atomic energy.

Such gases or liquids entering the radiator through the duct 46 leave through duct 47. Conduit 127A, which is a continuation of duct 123, passes through the radiator 129A where the gases in the conduit are heated and expanded to pass through the manifold 130 and the hot gas intake port 131, FIG. 13. The gases may then leave through the port 134 as in the previously described embodiment.

When the gases employed are heated other than by combustion, there are obviously no combustion products to be scavenged and dissipated into the atmosphere. As a consequence, the gases may recirculate—providing they are cooled to a satisfactory degree. This may be done by a heat exchanger 48, FIG. 19. The hot gases from the so-called exhaust port 134 pass through the duct 49 and thence through the heat exchanger 48 and into the cool air inlet port through the manifold 118A. The required coolant enters the heat transfer unit 48 through a pipe 50 and leaves through a pipe 51. Other details of this heat rejection system are not shown as they may be of conventional design forming no part of the present invention per se.

The various manifolds and conduits shown in FIG. 20 are the same as those shown in FIGS. 12 to 17 except that a pipe 52 communicates with the conduit 123 through an opening therein designated as 53. The pipe 52 is provided with a valve 54 so that some of the air compressed in the engine may be bled off through the opening 53 to the pipe 52 for uses other than the operation of the engine.

In FIG. 21, an arrangement is illustrated whereby the pressure of the compressed air in the compressor side of the engine may be reduced for altering the operation of the invention by removing some of the air before it has reached its maximum degree of compression at the regular compressor discharge port. This entails an intermediate port between the fresh air manifold 118B, which is the counterpart of the other fresh air manifolds of the previously described embodiment, and which communicates with the air inlet port, as hereinbefore explained and the compressor discharge port. The compressed air manifold 123 receives the air from the compressed air discharge port in the manner previously described, and it will be obvious that air leaving through a port located as indicated at 55 will have been compressed to a lesser degree than that which reaches the regular compressed air discharge port. The air that is removed from the compressor at position 55 passes through a duct 56 to the compressed air conduit 123 through an opening 57 therein. The duct 56 is provided with a valve 58 for regulating the amount of compressed gas that is by-passed at less than maximum pressure to the conduit 123 for varying the operation of the engine.

Various other modifications may of course be made in the illustrative embodiments hereinbefore described, and parts may be changed in position or replaced by other components performing the same functions, or the same function plus additional functions—all without departing from the broad spirit of the invention as succinctly set forth in the appended claims.

The inventor claims:

1. A rotary external combustion engine comprising: a single pair of meshing rotors, one of said rotors having a plurality of helical grooves therein and the other of said rotors having a plurality of helical teeth to mesh and mate with said helical grooves; a casing closely surrounding said rotors and having an air inlet port therein for admitting air into the confined region between said casing and rotors near one end therof on the side of the rotors where they are rolling together, said rotors acting progressively to diminish the volume of the air as it is moved by said teeth toward the opposite end of said rotors; said casing having a compressed air discharge port therein adjacent said opposite end of said rotors; and a hot gas intake port in the side of said casing opposite from said air inlet port and adjacent the first mentioned ends of said rotors, said hot gas intake port communicating with the region where the teeth of the toothed rotor begin to leave said grooves; a conduit for conducting the compressed air from said compressed air discharge port to said hot gas intake port; means for introducing fuel into said conduit; means for igniting the fuel and air in said conduit, the mixture of fuel and air that is heated and expanded by its combustion acting to separate the helical teeth and grooves and turn the rotors as the expanding volume of the mixture is moved by said teeth toward said opposite end of said rotors; said casing having an exhaust port adjacent said opposite end to allow the exhaust gases to escape therethrough; the helical twist of said grooves and teeth and the relative location of said air inlet and exhaust ports being such that any given groove or intertooth channel is simultaneously in communication with said air inlet and exhaust ports during the scavenging phase to permit the ingestion of fresh air into said groove through said air inlet port and the expulsion of exhaust gases from said exhaust port; and means for forcing said ingestion and expulsion.

2. The combination set forth in claim 1 with the addition of a blower communicating with said air inlet port for blowing fresh air into the grooves and expelling the products of combustion therefrom when they are aligned with said air inlet and exhaust port.

3. The combination set forth in claim 1 with the addition of an exhaust fan to remove the combusted products from said grooves through said exhaust port and to ingest fresh air into said grooves through said air inlet port.

4. The combination set forth in claim 1 in which, after the ingestion of fresh air, any combusted gases remaining in any groove are forced through said exhaust port by the displacing action of the helical tooth traversing said groove.

5. The combination set forth in claim 1 in which the air inlet, hot gas intake and exhaust ports are so related to each other and to the helical twist of the grooves and intertooth spaces of the revolving rotors that these grooves and spaces move into communication with the exhaust port before the hot gases in these grooves and spaces have expanded to atmospheric pressure and before the air intake port opens, thus causing said hot gases to rush at high velocity through the exhaust port and create a jet which, upon the opening of the air inlet port, entrains fresh air therein to traverse said grooves and spaces and scavenge the exhaust gases therefrom.

6. The combination set forth in claim 1 in which a sufficient portion of each port is in the casing side wall adjacent the rotors to give each port a total cross-sectional area sufficiently great to minimize breathing losses.

7. The combination set forth in claim 1 in which the portions of the ports that are located in the cylindrical side walls of the casing are of such relative size and position with respect to each other and to the volume and helical twist of the rotor grooves that the engine operates substantially with a Brayton cycle.

8. The combination set forth in claim 1 in which the portions of the ports that are located in the cylindrical side walls of the casing are of such relative size and position with respect to each other and to the volume and helical twist of the rotor grooves that the engine operates substantially with a diesel cycle.

9. The combination set forth in claim 1 in which a pressure-reducing port is interposed on the compression side of the case between the air intake port and the compressor discharge port and in which said conduit has an opening therein near the latter port there being a pipe leading from said pressure-reducing port to said opening, said pipe having a valve therein to control the amount of compressed air by-passed through said pipe to said conduit.

10. The combination set forth in claim 1 in which an opening is provided between the air inlet port and the portions of the conduit where heat is applied for obtaining compressed air from the system for external use.

References Cited by the Examiner

UNITED STATES PATENTS

| | | | |
|---|---|---|---|
| 2,067,453 | 1/1937 | Lee | 60—59 |
| 2,112,672 | 3/1938 | Lasley | 60—39.45 |
| 2,158,532 | 5/1939 | Bullen. | |
| 2,349,600 | 5/1944 | Adams | 60—39.45 |
| 2,476,397 | 7/1949 | Bary. | |
| 2,485,687 | 10/1949 | Bailey | 123—12 |
| 2,511,441 | 6/1950 | Loubiere | 60—44 |
| 2,808,813 | 10/1957 | Lindhagen et al. | |
| 2,843,094 | 7/1958 | Berck | 91—84 |
| 3,043,763 | 7/1962 | Spillmann | 60—59 X |
| 3,065,162 | 11/1962 | Hub | 60—35 X |
| 3,158,002 | 11/1964 | Spillmann | 60—59 |
| 3,174,276 | 3/1965 | Baker | 60—35 X |

MARK NEWMAN, *Primary Examiner.*

SAMUEL LEVINE, *Examiner.*

F. T. SADLER, *Assistant Examiner.*